Jan. 15, 1963  C. W. MUSSER  3,073,250
FLUID DEVICE
Filed June 20, 1960  2 Sheets-Sheet 1

Inventor
C Walton Musser
By his Attorney

Jan. 15, 1963 C W. MUSSER 3,073,250
FLUID DEVICE
Filed June 20, 1960 2 Sheets-Sheet 2

United States Patent Office 3,073,250
Patented Jan. 15, 1963

3,073,250
FLUID DEVICE
C Walton Musser, Beverly, Mass., assignor to United Shoe Machinery Corporation, Flemington, N.J., a corporation of New Jersey
Filed June 20, 1960, Ser. No. 37,338
17 Claims. (Cl. 103—117)

The present invention relates to fluid devices of the chatracter of fluid motors and pumps.

A purpose of the invention is to produce a fluid device of small size which has a large fluid capacity.

A further purpose is to produce a fluid device such as a fluid motor or pump which has a series of parallel fluid paths, with effective sealing between the inlet and the outlet in each one of the fluid paths.

A further purpose is to produce a fluid device such as a pump or motor which will have comparatively small simple parts, providing for low mtaintenance and ready replacement in case of damage to one of the parts.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

Figure 1:
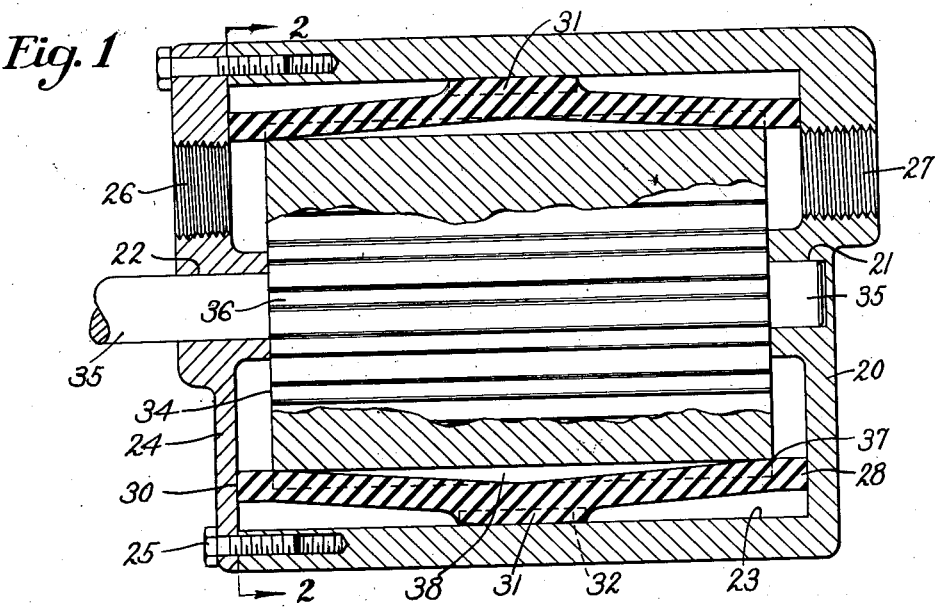
FIGURE 1 is a central axial section of a fluid motor and pump according to the present invention.

Describing in illustration but not in limitation and referring to the drawings:

The present invention applies certain principles of strain wave gearing or harmonic drive as embodied in my U.S. Patent No. 2,906,143, granted September 29, 1959, for Strain Wave Gearing, but departs entirely from such previous gearing because no strain inducer or wave generator is used, and an elastomer element is caused to perform the function both of the strain gear or wave carrier on the one hand, and of the strain inducer or wave generator on the other hand.

The invention has been embodied in a simple form of high volume small size fluid motor or pump.

In the preferred embodiment the tooth shape has been modified so that the teeth on the elastomer element, which may be called the flexspline, are at all times in sealing contact with the teeth on the rigid circular spline at some position along the length which will differ from tooth to tooth around the circumference. This is accomplished by making the shape of the teeth equivalent to the hypocycloidal movement of a point on the flexspline when an elliptoid is rotated within the flexspline.

The movement of the elliptoidal shape which the flexspline achieves as relative rotation of one of the tooth elements with respect to the other takes place tooth by tooth, and is similar to that which would be produced if an elliptoidal wave generator actually rotated around the common axis.

Referring to the drawings, a cylindrical housing 20 suitably of metal or the like has axial bearings 21 and 22 at the opposite ends which may be provided with antifriction elements (not shown), and has a cylindrical inner contour 23. The housing is provided with an end closure 24 secured by removable bolts 25. An inlet opening 26 is provided at one end of the housing and an outlet opening 27 is provided at the other end, the inlet and outlet openings communicating with fluid piping as well known.

The question of which is the inlet and which is the outlet is merely a question of direction of rotation and direction of spiral pitch of the teeth, and the inlet and outlet can be reversed if one of these features is changed. Of course it will be evident that the question of whether the device is a fluid motor or a pump should be kept in mind.

In side the housing and directly abutting against the opposite ends is a flexspline or flextube 28 sealing against the ends at 30. The flexspline 28 may be made of any suitable elastomer, examples being neoprene, buna-n, butyl rubber, polyethylene, polytetrafluorethylene, and linear polyamide (nylon).

While the flexspline 28 has its ends in sealing relationship within the ends of the housing, it can under the lubrication of the fluid be moved radially in and out as later explained. There is adequate clearance in the housing to permit relative inward and outward movement. To prevent the rotation of the flexspline, lugs 31 are provided at its outer circumference near the center, and these interengage with lugs 32 extending inwardly at intervals around the circumference of the housing to function like gear teeth. Any other suitable interlock means may be used as desired.

Figure 2:
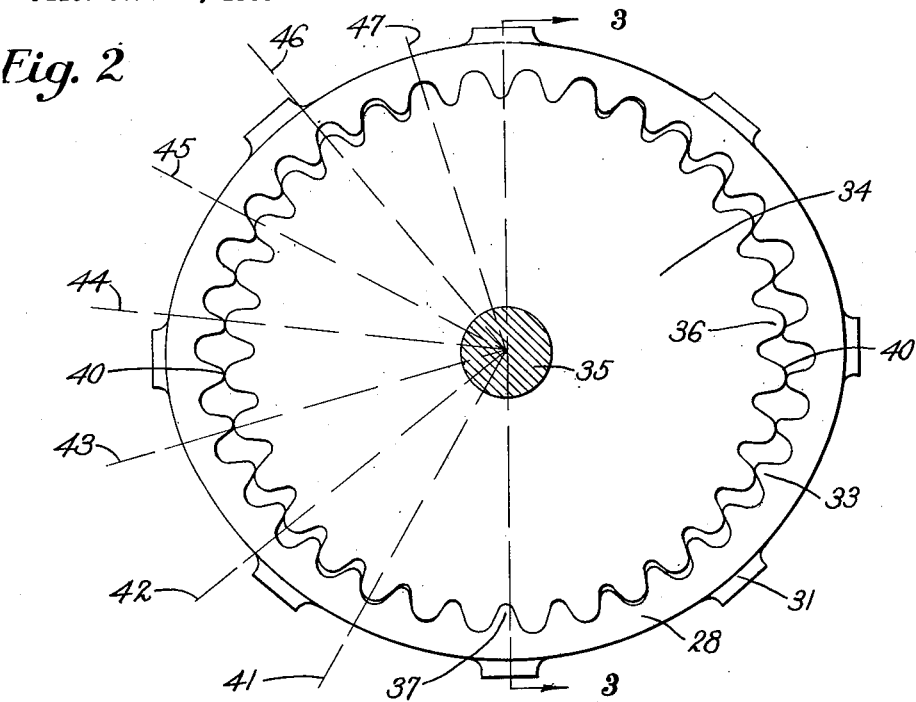
FIGURE 2 is an end elevation of the device of FIGURE 1, omitting the housing and the closure plate at the end of the housing, the view being taken in the position of line 2—2 in FIGURE 1.

On the inside of the flexspline or flextube 28 there are teeth 33 as best seen in FIGURE 2. These teeth as shown are essentially of hypocycloidal shape. They are, however, altered slightly from the hypocycloidal shape so as to accommodate the radius 49 of the cutter which is used in the machining operation to produce such teeth. The teeth 33 have a slight spiral pitch or twist. This twist can be in either direction, but it will be evident that the direction of the twist will determine the direction that the fluid is pumped, for a particular direction of rotation of the rotor shaft as later explained.

The twist of the teeth goes through an angular distance equal to the pitch between two teeth in the total length of the rotor. Therefore, when viewing the flexspline or flextube 28 from the end, the teeth at the near end will be directly in line with the adjacent teeth at the far end.

Telescoping within the flexspline or flextube 28 and coaxial with it is an inner rigid circular spline or rotor 34 which is rotatably mounted on a rotor shaft 35 in the housing bearings 21 and 22. The rotor will normally be made of a constructional metal or alloy such as steel, stainless steel, bronze, or the like, but it may be made of an elastomer such as rubber, synthetic rubber, linear polyamide (nylon), polytetrafluorethylene, or the like if desired. Around the outside of the spline or rotor 34 there is a series of teeth 36. The teeth 36 are of the same circular pitch and identically the same contour as the teeth on the flexspline 28. The teeth 36 are also of hypocycloidal shape altered by the diameter of the cutter used in machining as previously explained.

The teeth however on the outer element, the flexspline 28, are more numerous than those on the inner rigid spline, for example there being 34 teeth on flexspline 28 and 32 teeth on the inner spline in the particular embodiment.

It will be evident that the difference in number of teeth the inner and outer elements 28 and 34 should be suitably a small number such as 2 or 3, preferably 2, as it will determine the number of lobes on the cross-sectional contour of the flexspline 28. Whether in the particular embodiment of the device the flexspline is the inner or the outer of the two elements, the larger number of teeth will be employed on the outer element.

The difference in the number of teeth will follow these principles.

The flexspline 28 and the circular spline 34 are coaxial and coaxial to the inside of the housing.

By reason of the fact that the flexspline has a resilient urge to push against or hug against the circular spline, contact between the flexspline and the circular spline is maintained without a strain inducer or wave generator.

It will be evident that in view of the fact that the teeth are all of the same circular pitch and of the same contour, and in view of the fact that the flexspline is elastically deflected into the elliptoidal form and tends to hug the cooperating element, there will be a point of sealing between the teeth of the two elements at a certain axial position along each tooth as later explained.

A point on the tooth of the flexspline describes a hypocycloid 48 in moving from one tooth to the next. When the shape which is rotated is an elliptoid, that is, a sine wave of two wave lengths superimposed on a circle, the hypocycloid is altered to the extent that the length of its base is only one half of that of a standard hypocycloid. When the teeth are made in this manner with the appropriate height in relation to their base length, which is the pitch between teeth, the sealing contact above referred to will occur somewhere along the sides of the teeth through their entire circumference.

Figure 3:
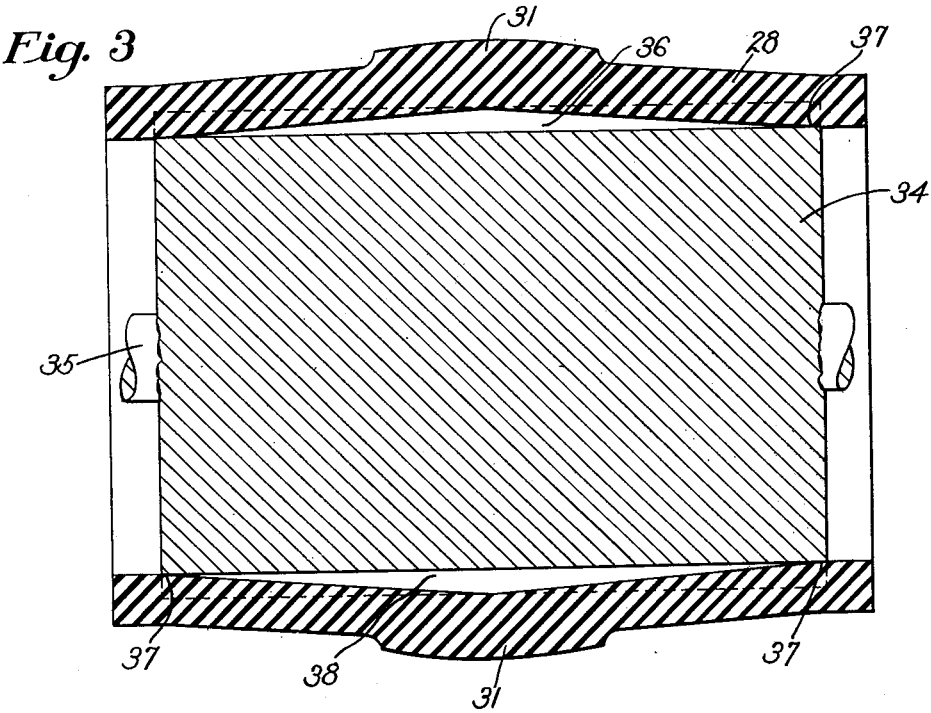
FIGURE 3 is an axial section of FIGURE 2 on the line 3—3, omitting the housing.

Under the conditions of the particular case, the flexspline 28 will form the cross-sectional contour of an elliptoid as best seen in FIGURE 2, with a minor axis which is vertical and a major axis which is horizontal in this figure. At the minor axis the teeth are in full mesh at the opposite ends of the flexspline as shown at 37 in FIGURES 1, 2 and 3. Along the minor axis the teeth are out of phase at an intermediate point 38 as shown in FIGURES 1 and 3.

At the major axis as shown in FIGURE 2, the teeth are out of phase at points 40, with the small radius point of the most inward projection of the tooth 33 on the flexspline 28 in contact with the most outward projection of the tooth 36 on the inner spline 34. However, intermediate between the ends of the device along this axis there is full tooth engagement.

In between the positions of the major and minor axes, the teeth are between these two extreme relationships and at some point along the length of the flexspline each tooth is in contact with the corresponding tooth on the inner spline at each tooth position.

Since the teeth on the flexspline have a helix angle and the teeth as shown have no helix angle on the inner spline it will be evident that the relative tooth position of the teeth on the flexspline with respect to those on the inner spline or rotor will be changed as one proceeds along the length of the teeth.

This will be evident from FIGURE 3 where the teeth are in full mesh at one end, are out of phase and out of mesh in the center and are in full mesh at the other end. This also will be evident by comparing the relations of the teeth at positions 41, 42, 43, 44, 45, 46 and 47 around half of the circumference of FIGURE 2. If one considers that each of the radial lines 41 to 47 inclusive successively moves into the vertical position as shown in FIGURE 3, FIGURE 2 shows the tooth position at the end of the flexspline at the corresponding radial line.

Figure 5:
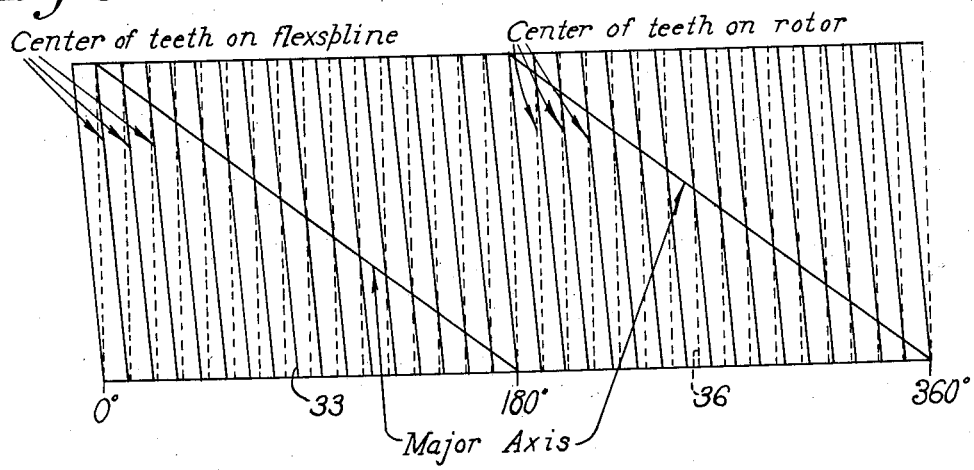
FIGURE 5 is a development of the teeth of both sets as employed in the invention, the tooth surfaces being unrolled to form a flat presentation.
Figure 4:
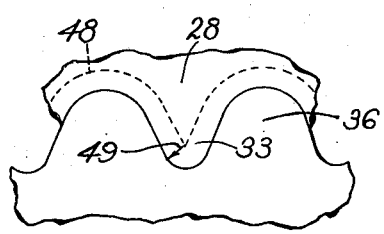
FIGURE 4 is a fragmentary enlargement of FIGURE 2.

The relationship thus described can be better understood by reference to FIGURE 5, which shows a developed view of the two sets of teeth produced by unwrapping the entire circumference of both the flexspline 28 and the inner spline 34. The solid lines indicate the centers of the teeth on the flexspline and the dotted lines indicate the centers of the teeth 36 on the inner spline. It is noted that there is a helix angle on the teeth 33 on the flexspline 28 and not on the teeth 36 on the inner spline. As a consequence the lines 36 intersect the lines 33 along the major axis. The major axis, therefore, produces a double lead helix which advances 180° in the length of the inner spline 34.

It will be evident that the dotted lines representing the teeth on the inner spline and the solid lines representing the centers of the teeth on the flexspline will cross at different points along the circumference. If these points of crossing are connected, we get two lines of intersection which go from zero to 180° and from 180° to 360° in passing from one end to the other of the rotor.

This line connecting the intersection between the dotted line and the solid line will represent the places where the teeth are out of phase with each other and hence will represent the major axis of the elliptoid. Here it can be seen that the major axis of the elliptoid at one end is directly aligned with the major axis of the elliptoid at the other end, but there is a helix angle between the two axes so that the place where the teeth are in full mesh, which is at the minor axis, will also have a helix angle. This last helix angle is one half turn in the length of the rotor.

As a consequence, along any one tooth of the rotor there is a position where the teeth on the flexspline are in full intermesh with the teeth in the rotor. When FIGURE 2 is examined, it will be seen that there is a space for fluid entrance between the teeth at all places except the minor axis, however, proceeding along any one of these spaces there is a point where its passageway is blocked by the teeth on the flexspline 28 being in full mesh with the teeth on the rotor 34. This has the effect of a pinched-off tube. It is similar to a pinched-off tube because each tooth seals through its full length at some portion of the tooth.

At those places along the length where the teeth are out of mesh there is an opening made by the space between the teeth on the flexspline 28 and the teeth on the inner spline or rotor 34. However, there is no connection between adjacent teeth due to the sealing action on the teeth by the flexspline on the inner spline.

Viewing this in FIGURE 5, it will be seen that if the major axis lines are shifted it will cause the interrelationship on the teeth of the flexspline to change with respect to the teeth on the inner spline. As a result, if the major axes lines where the lines 36 cross over lines 33 in FIGURE 5 were moved to the left, it would cause the intersection of these lines to move toward the bottom of the drawing. Therefore, rotation of the elliptoidal shape causes an advance of the sealing portion of the minor axis to move axially along the teeth. Any fluid and especially any liquid trapped in the tooth spaces is therefore pushed ahead of these sealing points toward the outlet.

While the above discussion refers to movement of the major and minor axes by rotation of the elliptoidal shape, during the movement of this shape through a distance of 180° revolution of the major axis will advance the rotor, in relation to the flexspline a distance of one tooth. In other words, for each half revolution of the elliptoidal shape there will be a movement of the rotor in relation to the flextube of one tooth. Conversely, in the case of a 32-tooth rotor, if the rotor is rotated 1/32 of a revolution the elliptoidal shape or the major and minor axes will rotate ½ revolution. This then will cause 16 rotations of the major and minor axes in one rotation of the rotor.

An illustration of the amount of fluid which can be pumped when the device is used as a pump is as follows:

| | |
|---|---|
| Number of teeth on the flexspline | 34 |
| Number of teeth of the inner spline | 32 |
| Maximum radial displacement of a tooth__inches | 0.250 |
| Pitch diameter of rotor_____do | 4 |
| Length of rotor_____do | 4 |

Under this set of conditions, the cross-sectional area of the space provided between teeth will be approximately $\pi/2$ square inches, and the volume for a 4 inch length will be $2\pi$ cubic inches. This is the amount of fluid which will be pumped in one half revolution of the elliptoid. Since there are 32 of these per rotation of the rotor, it will give a volume of 32×2π, or approximately 200 cubic inches per rotation of the rotor. This is a rather large discharge for a device having a diameter of 4 inches and a length of 4 inches.

It will be evident that if instead of turning the rotor shaft 35 to rotate the device and operate it as a pump, fluid is forced in through one end and discharged at the other end, it will cause rotation of the rotor and the device will function as a fluid motor.

While no strain inducer is required where the flexspline is an elastomer, a strain inducer or wave generator may be used particularly if the flexspline is not an elastomer.

As a convenient way of indicating a device which can function either as a fluid motor or as a fluid pump, or each if desired, can perform only one of these functions, the claims refer to a fluid displacement device.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a fluid displacement device having inlet and outlet ports, relatively rotatable inner and outer coaxial telescoping elements, one element being relatively stationary with respect to the other, the inner of which has on its outer surface a set of teeth and the outer of which has on its inner surface a set of cooperating teeth more numerous than the teeth on the inner element, one of said elements being an elastomer and tending to hug against the other element solely by reason of its elastomeric properties, the teeth on the inner and outer elements in any cross sectional plane being fully in mesh and in contact at a plurality of circumferentially spaced points and being out of mesh and in contact at points intermediate between said circumferentially spaced points, the teeth on one element having a helix angle and the teeth on the other element having no helix angle, the helix in the length of the elements circumferentially progressing the fully meshed tooth contact areas through an angle at least equal to the angle between fully meshed contact areas, the difference in the number of teeth corresponding with the number of circumferentially spaced points at which the teeth are fully in mesh and in contact, means for rotating one element with respect to the other element about the common axis and whereby the flexed elastomeric element is rotated throughout its length about the common axis to provide end sealed axially moving passageways for fluid between the non-fully meshed teeth.

2. A fluid displacement device of claim 1, in which the outer element is an elastomer.

3. A fluid displacement device of claim 1, in which the number of circumferentially spaced points at which the teeth are fully in mesh and in contact is two and the difference in the number of teeth is two.

4. In a fluid displacement device having inlet and outlet ports, relatively rotatable inner and outer coaxial telescoping elements, one element being relatively stationary with respect to the other, the inner of which has on its outer surface a set of teeth and the outer of which has on its inner surface a set of teeth cooperating with the set of teeth on the inner element and more numerous than the teeth on the inner element by two teeth, one of the elements being flexible, there being a helix angle on one set of teeth and no helix angle on the other set of teeth, the teeth of the two sets in any cross sectional plane being fully in mesh and in contact at two spaced points around the circumference with intermediate points at which the teeth are in contact with but not in mesh, the helix in the length of the elements circumferentially progressing the fully meshed contact areas through an angle of at least 180°, and the flexible element being radially deflected in such manner as to maintain contact with the other element at said two spaced points, and means for rotating one element with respect to the other about the common axis and thereby rotating the flexure pattern throughout the length of the flexible element about the common axis to provide axial passageways for fluid between the non-fully meshed teeth.

5. In a fluid displacement device having inlet and outlet ports, relatively rotatable inner and outer coaxial telescoping elements, one element being relatively stationary with respect to the other, the inner of which has on its outer surface a set of teeth, and the outer of which has on its inner surface a set of cooperating teeth more numerous than the teeth on the inner element, said teeth of both sets having the same circular pitch and the tooth contour of the one being the same as the spaced contour of the other, there being a spiral pitch on one set of teeth and there being no spiral pitch on the other set of teeth, one of said elements being an elastomer and being deflected so that its teeth are in full mesh and in contact with the teeth of the other element at a plurality of circumferentially spaced points with intermediate points at which the respective teeth are out of mesh, and each tooth of the elastomer element sealing with respect to the adjoining teeth of the other element at a position along the axial length, said position of sealing along the axial length differing on adjoining teeth of the same set, the difference in the number of teeth on the two sets corresponding to the number of said spaced points, and means for rotating the shape of one element with respect to the other about the common axis and thereby projecting a wave of deflection around the elastomer element and rotating the shape of the elastomer element about the common axis to provide axial passageways for fluid between the non-fully meshed teeth.

6. A fluid displacement device of claim 5, in which the elements are fully in mesh and in contact at two circumferentially spaced points and the difference in the number of teeth on the two sets is two.

7. A fluid displacement device of claim 5, in which the tooth contour of the inner and outer member is hypocycloidal.

8. A fluid displacement device of claim 5, in which the means for rotating one of the elements comprises means for turning one of the elements while holding the other element stationary.

9. A fluid displacement device of claim 5, in combination with a housing around the outer element, and interlock means between the outer element and the housing preventing rotation of the outer element in the housing, the outer element being an elastomer, and the inner element being free to rotate.

10. A fluid displacement device of claim 9, in which the means for rotating comprises means for turning the inner element.

11. A fluid displacement device of claim 9, on which the teeth of the inner element have no spiral pitch.

12. A fluid displacement device of claim 5, in which each tooth of the element provided with a helix angle goes through an angular distance equal to the pitch between two teeth in the total length of said element, so that the tooth at one end of the element having the helix angle is directly in line with the adjacent tooth at the opposite end of that element.

13. In a fluid displacement device having inlet and outlet ports, an inner rigid circular spline having an outer surface provided with a set of teeth, an outer elastomer flexspline coaxial with, surrounding and engaging the inner circular spline, the flexspline having on its inner surface a set of cooperating teeth more numerous than the teeth on the inner circular spline, said teeth of both sets having the same circular pitch and a mating contour, there being a spiral pitch on one set of teeth and there being no spiral pitch on the other set of teeth, the flexspline tending to hug the outside of the inner circular spline and being deflected so that somewhere along its length its teeth are fully in mesh and in contact with the teeth on the circular spline throughout 360°, and, in any one cross section at a plurality of circumferentially spaced points with intermediate points at which the teeth are out of mesh, the number of such circumferentially spaced points at which the teeth are in contact and fully in mesh corresponding to the difference in the number of teeth between the circular spline and the flexspline, one of the inner circular spline and the outer flexspline being relatively stationary and the other being relatively rotatable, means for producing relative rotation between the inner circular spline and the flexspline and thereby propagating a wave of deflection around the flexspline and rotating the shape of the flexspline around the common axis to provide axial passageways for fluid between the non-fully meshed teeth.

14. A fluid displacement device of claim 13, in which the number of circumferentially spaced points of contact and the difference in the number of teeth of the inner and outer sets are both two.

15. A fluid displacement device of claim 13, in which the teeth of both sets are hypocycloidal.

16. A fluid displacement device of claim 13, in which the teeth of the inner circular spline have no spiral pitch.

17. A fluid displacement device of claim 13, in which the means for producing rotation comprises means for turning one of the inner circular spline and the flexspline while holding the other stationary.

References Cited in the file of this patent

UNITED STATES PATENTS

| | | |
|---|---|---|
| Re. 21,374 | Moineau | Feb. 27, 1940 |
| 2,691,347 | Zimmer | Oct. 12, 1954 |
| 2,764,101 | Rand | Sept. 25, 1956 |
| 2,874,643 | Bourke | Feb. 24, 1959 |
| 2,906,143 | Musser | Sept. 29, 1959 |